(No Model.)
T. MERRY.
SOLDERING IRON.
No. 506,011. Patented Oct. 3, 1893.
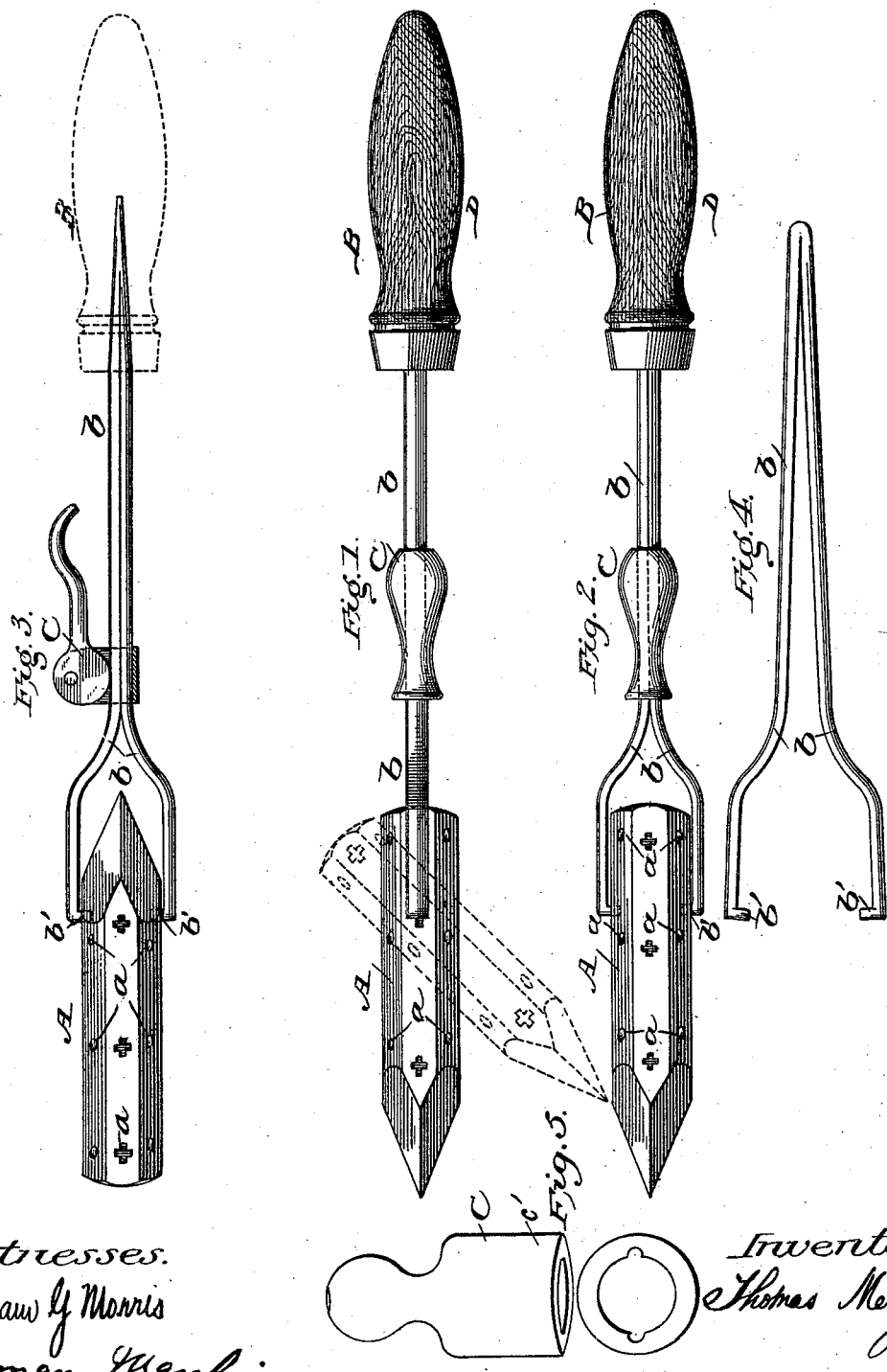
Witnesses.
William G. Morris
Herman Manheim
Inventor.
Thomas Merry

UNITED STATES PATENT OFFICE.

THOMAS MERRY, OF CHICAGO, ILLINOIS.

SOLDERING-IRON.

SPECIFICATION forming part of Letters Patent No. 506,011, dated October 3, 1893.

Application filed October 17, 1892. Serial No. 449,175. (No model.)

*To all whom it may concern:*

Be it known that I, THOMAS MERRY, a citizen of Great Britain, residing at Chicago, in the county of Cook and State of Illinois, have invented new and useful Improvements in Soldering-Irons; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to form a soldering iron having a detachable handle, so that the same handle may be used with a variety of irons.

Its further object is to secure such means of attachment of the handle to the iron that the latter may be used in any desired angular position.

Its further object is to provide suitable means for securing the handle to the iron.

The invention consists in the use of soldering iron of the usual form, which, however, shall be provided with one or more pairs of sockets or recesses adapted to be engaged by a forked or clamped handle.

In the accompanying drawings, Figure 1 is an elevation of the soldering iron showing the edge of the handle. Fig. 2 is a similar view showing the side of the handle. Fig. 3 is a similar view showing one form of device for locking the handle to the iron; and Fig. 4 is a detail of the clamping portion of the handle. Fig. 5 shows details of a modified form of locking ring.

I show at A, an ordinary soldering iron, (in using the term "iron" I am following the habit of the trade; the part A, is in fact, of copper;) at B, the handle; and at C, a sliding locking device for securing the handle to the iron. The stem of the handle is split to form the two arms of a clamp as shown at $b$. Preferably this portion of the handle is formed by doubling a piece of half round metal midway of its length, both of the arms thus formed being bent or off-set near their ends to spread them apart so that they will fit over the iron A. The extreme ends of the arms $b$, are bent inwardly as shown at $b'$, for the purpose of forming hooks or spurs which are adapted to engage in the sockets $a, a$, in the iron. The sliding sleeve C, is placed upon this handle stem, and being pushed down toward the iron, clamps it securely thereupon. The handle D, of wood or other nonconducting material is placed upon the end of the stem, being socketed in the usual manner to receive it.

The sockets $a$, in the iron A, may be of any desired shape. It has often been found necessary to have the tools of this character of special construction for special work, the point of the iron being oblique to the handle, and for some purposes it is desirable to have the iron swing loosely in the handle. If the sockets $a$, are round, the iron will swing freely upon the spurs $b'$. If made angular as shown at $a'$, and the spurs $b'$, are of similar shape, it will be seen that the iron will be held rigidly by the handle, and it is obvious that such angular sockets may be placed in any desired position upon the sides of the iron so that the latter will be held at any desired angle with reference to the handle. Furthermore it will be seen that the iron may be entirely reversed so that both of its ends become available for soldering purposes. For certain kinds of work the tinner needs an iron with a round end such as is shown in the drawings, so that he may have a point at one end and a round end at the other, and be able to do all kinds of work with a single tool.

The locking sleeve may be of simple form such as I show in Figs. 1 and 2, or it may be provided with a cam lever $c$, the lever being adapted to fold down against the handle and securely lock the same upon the iron. I regard this as the most desirable form of locking device. If desired, the locking sleeve may have its outer end enlarged as shown at $c'$, so that it may fit upon the end of the iron when the latter is in alignment with the handle, and abut against the side of the iron when it is transverse to the handle, so as to more effectually prevent flexure.

I am aware that it is not new to provide a soldering tool with a detachable handle and that such handle has been made with clamping arms. I do not, therefore, broadly claim such construction.

What I claim as my invention, and desire to protect by Letters Patent, is—

1. The combination in a soldering tool of a handle whose stem is in the form of clamping arms, with an iron having a multiple number of pairs of sockets in its sides for the engagement of the clamping arms, whereby the relative position of the handle and iron may be varied, substantially as described.

2. In a soldering tool the combination of a split handle having its arms spread and their ends turned inwardly as spurs, with an iron having a multiple number of pairs of sockets in its sides for the engagement of the handle spurs, the sockets and spurs being angular and of corresponding form, the several pairs of sockets being set at varying angles, substantially as described and for the purpose specified.

3. In a soldering tool the combination with an iron having sockets in its sides for engaging a detachable handle, of a handle having a pair of clamping arms adapted to engage the sockets and a pressure cam carried upon the handle by a sliding sleeve, substantially as described.

4. In a soldering tool, the combination with an iron having sockets in its sides for engaging a detachable handle, of a handle having a pair of clamping arms adapted to engage the sockets and a locking sleeve adapted to slide upon the handle and press its arms into the sockets, said sleeve having its outer end enlarged whereby it is adapted to fit over the iron, substantially as described and for the purpose specified.

THOMAS MERRY.

Witnesses:
  WILLIAM WITTE,
  WILLIAM GRAY.